United States Patent
Huntington et al.

(10) Patent No.: US 11,451,857 B2
(45) Date of Patent: *Sep. 20, 2022

(54) METHOD AND SYSTEM TO NAVIGATE VIEWABLE CONTENT

(71) Applicant: OpenTV, Inc., San Francisco, CA (US)

(72) Inventors: Matthew Huntington, Twickenham (GB); David A. Merkoski, San Francisco, CA (US); Celine Pering, Palo Alto, CA (US); Jordan Kanarek, San Francisco, CA (US); David Scott Nazarian, San Francisco, CA (US); Joshua Wagner, San Francisco, CA (US); Benjamin A. Rottler, San Francisco, CA (US); Andrew Zeldis, San Francisco, CA (US); Gina Terada, San Francisco, CA (US); Jared Marr, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,412

(22) Filed: May 28, 2021

(65) Prior Publication Data

US 2021/0352356 A1 Nov. 11, 2021

Related U.S. Application Data

(63) Continuation of application No. 16/673,015, filed on Nov. 4, 2019, now Pat. No. 11,057,665, which is a
(Continued)

(51) Int. Cl.
*H04N 21/431* (2011.01)
*G06F 16/44* (2019.01)
(Continued)

(52) U.S. Cl.
CPC ....... *H04N 21/4312* (2013.01); *G06F 3/0482* (2013.01); *G06F 16/435* (2019.01);
(Continued)

(58) Field of Classification Search
CPC ......... H04N 21/25891; H04N 21/4221; H04N 21/42204; H04N 21/47; H04N 21/482;
(Continued)

(56) References Cited

U.S. PATENT DOCUMENTS

| 5,179,653 A | 1/1993 | Charles |
| 5,623,613 A | 4/1997 | Rowe et al. |

(Continued)

FOREIGN PATENT DOCUMENTS

| AU | 2007292910 B2 | 2/2012 |
| AU | 2007309675 B2 | 3/2012 |

(Continued)

OTHER PUBLICATIONS

"European Application Serial No. 18204519.5, Response filed Aug. 4, 2021 to Communication Pursuant to Article 94(3) EPC dated Jun. 9, 2021", with English claims, 6 pages.

(Continued)

*Primary Examiner* — William D Titcomb
(74) *Attorney, Agent, or Firm* — Schwegman Lundberg & Woessner, P.A.

(57) ABSTRACT

A method and system to navigate viewable content in the context of television entertainment is provided. In one example embodiment, the system comprises a presentation module to present main content on a display screen, a communications module to receive a first request associated with a first directional key on a remote control device, a navigation mode detector to determine a navigation mode associated with the first request; a margin menu module to activate a margin menu associated with the determined (Continued)

navigation mode. The margin menu may be presented along one of the margins of a display screen, while permitting viewing of the main content.

20 Claims, 11 Drawing Sheets

Related U.S. Application Data continuation of application No. 15/851,168, filed on Dec. 21, 2017, now Pat. No. 10,506,277, which is a continuation of application No. 15/159,556, filed on May 19, 2016, now Pat. No. 9,860,583, which is a continuation of application No. 14/184,371, filed on Feb. 19, 2014, now Pat. No. 9,374,621, which is a continuation of application No. 12/377,650, filed as application No. PCT/US2007/019554 on Sep. 7, 2007, now Pat. No. 8,701,041.

(60) Provisional application No. 60/911,009, filed on Apr. 10, 2007, provisional application No. 60/842,735, filed on Sep. 7, 2006.

(51) Int. Cl.
G06F 16/435 (2019.01)
G06F 16/9535 (2019.01)
H04N 21/482 (2011.01)
H04N 21/45 (2011.01)
H04N 21/472 (2011.01)
H04N 21/4782 (2011.01)
H04N 21/47 (2011.01)
H04N 21/422 (2011.01)
G06F 3/0482 (2013.01)
H04N 21/258 (2011.01)
H04N 21/8549 (2011.01)

(52) U.S. Cl.
CPC .......... *G06F 16/44* (2019.01); *G06F 16/9535* (2019.01); *H04N 21/25891* (2013.01); *H04N 21/4221* (2013.01); *H04N 21/42204* (2013.01); *H04N 21/4314* (2013.01); *H04N 21/4532* (2013.01); *H04N 21/47* (2013.01); *H04N 21/4782* (2013.01); *H04N 21/47202* (2013.01); *H04N 21/482* (2013.01); *H04N 21/4826* (2013.01); *H04N 21/4828* (2013.01); *H04N 21/8549* (2013.01)

(58) Field of Classification Search
CPC .......... H04N 21/4826; H04N 21/4314; H04N 21/4532; H04N 21/47202; H04N 21/4782; H04N 21/4828; H04N 21/8549; H04N 5/44543
USPC .......................................................... 725/35
See application file for complete search history.

(56) References Cited

U.S. PATENT DOCUMENTS

| | | | |
|---|---|---|---|
| 5,790,115 A | 8/1998 | Pleyer et al. |
| 5,812,123 A | 9/1998 | Rowe et al. |
| 6,011,542 A | 1/2000 | Durrani et al. |
| 6,128,009 A | 10/2000 | Ohkura et al. |
| 6,147,714 A | 11/2000 | Terasawa et al. |
| 6,489,968 B1 | 12/2002 | Ortega et al. |
| 6,775,659 B2 | 4/2004 | Clifton-Bligh |
| 6,789,054 B1 | 9/2004 | Makhlouf et al. |
| 6,910,191 B2 | 6/2005 | Segerberg et al. |
| 7,228,556 B2 | 6/2007 | Beach et al. |
| 7,539,472 B2 | 5/2009 | Sloo |
| 7,672,950 B2 | 3/2010 | Eckardt, III et al. |
| 7,756,970 B2 | 7/2010 | Ebert et al. |
| 7,827,582 B2 | 11/2010 | Ellis |
| 7,890,976 B2 | 2/2011 | Kim et al. |
| 7,945,937 B2 | 5/2011 | Ogawa et al. |
| 7,987,491 B2 | 7/2011 | Reisman et al. |
| 8,321,892 B1 | 11/2012 | Malaby et al. |
| 8,429,692 B2 | 4/2013 | Zeldis et al. |
| 8,701,041 B2 | 4/2014 | Huntington et al. |
| 8,989,718 B2 | 3/2015 | Ramer et al. |
| 9,058,406 B2 | 6/2015 | Soroca et al. |
| 9,201,979 B2 | 12/2015 | Ramer et al. |
| 9,374,621 B2 | 6/2016 | Huntington et al. |
| 9,860,583 B2 | 1/2018 | Huntington et al. |
| 10,506,277 B2 | 12/2019 | Huntington et al. |
| 10,803,482 B2 | 10/2020 | Ramer et al. |
| 10,911,894 B2 | 2/2021 | Ramer et al. |
| 11,057,665 B2 * | 7/2021 | Huntington ........... G06F 16/435 |
| 2002/0174430 A1 | 11/2002 | Ellis et al. |
| 2002/0184183 A1 | 12/2002 | Cherry et al. |
| 2003/0070171 A1 | 4/2003 | Jeon |
| 2003/0197736 A1 | 10/2003 | Murphy |
| 2003/0197737 A1 | 10/2003 | Kim |
| 2004/0249632 A1 | 12/2004 | Chacon |
| 2005/0001058 A1 | 1/2005 | Shank et al. |
| 2005/0010583 A1 | 1/2005 | Clifton-Bligh |
| 2005/0022334 A1 | 2/2005 | Barker et al. |
| 2005/0097606 A1 | 5/2005 | Scott, III et al. |
| 2005/0160065 A1 | 7/2005 | Seeman |
| 2005/0160465 A1 | 7/2005 | Walker |
| 2005/0193015 A1 | 9/2005 | Logston et al. |
| 2005/0198024 A1 | 9/2005 | Sakata et al. |
| 2005/0204387 A1 | 9/2005 | Knudson et al. |
| 2005/0223342 A1 | 10/2005 | Repka et al. |
| 2006/0010684 A1 | 1/2006 | Lee et al. |
| 2006/0085819 A1 | 4/2006 | Bruck et al. |
| 2006/0106847 A1 | 5/2006 | Eckardt, III et al. |
| 2006/0123360 A1 | 6/2006 | Anwar et al. |
| 2006/0149709 A1 | 7/2006 | Huig et al. |
| 2006/0161950 A1 | 7/2006 | Shigeru et al. |
| 2006/0236342 A1 | 10/2006 | Kunkel et al. |
| 2006/0253801 A1 | 11/2006 | Okaro et al. |
| 2007/0233377 A1 | 10/2007 | Salay et al. |
| 2008/0301750 A1 | 12/2008 | Silfvast et al. |
| 2009/0049388 A1 | 2/2009 | Taib et al. |
| 2009/0077589 A1 | 3/2009 | Boyer et al. |
| 2009/0024851 A1 | 10/2009 | Ahluwalia et al. |
| 2010/0031162 A1 | 2/2010 | Wiser et al. |
| 2010/0050211 A1 | 2/2010 | Seldin et al. |
| 2010/0064325 A1 | 3/2010 | Fishermann |
| 2011/0023068 A1 | 1/2011 | Zeldis et al. |
| 2011/0090402 A1 | 4/2011 | Huntington et al. |
| 2011/0145753 A1 | 6/2011 | Prakash |
| 2014/0245357 A1 | 8/2014 | Huntington et al. |
| 2016/0323629 A1 | 11/2016 | Huntington et al. |
| 2018/0184153 A1 | 6/2018 | Huntington et al. |
| 2020/0213659 A1 | 7/2020 | Huntington et al. |

FOREIGN PATENT DOCUMENTS

| | | | |
|---|---|---|---|
| EP | 1653733 A2 | 5/2006 |
| EP | 1672920 A2 | 6/2006 |
| EP | 2062127 A2 | 5/2009 |
| EP | 2069943 A2 | 6/2009 |
| EP | 2069943 B1 | 11/2018 |
| FR | 2830715 | 4/2003 |
| FR | 2830715 A1 | 4/2003 |
| GB | 2376106 | 12/2002 |
| JP | 2001203954 A | 7/2001 |
| JP | 201188644 A | 10/2001 |
| JP | 2001283570 A | 10/2001 |
| JP | 2002055752 A | 2/2002 |
| JP | 2004096659 A | 3/2004 |
| JP | 2004194095 A | 7/2004 |
| JP | 2004527163 A | 9/2004 |
| JP | 2005018756 A | 1/2005 |
| JP | 2005101994 A | 4/2005 |
| JP | 2002135676 A | 5/2005 |
| JP | 2005514876 A | 5/2005 |

(56) References Cited

FOREIGN PATENT DOCUMENTS

| | | | |
|---|---|---|---|
| JP | 2006031206 A | 2/2006 | |
| JP | 2006085222 A | 3/2006 | |
| JP | 2006104603 A | 4/2006 | |
| JP | 2006140603 A | 6/2006 | |
| JP | 2006238276 A | 9/2006 | |
| JP | 2007189741 A | 7/2007 | |
| JP | 5860359 B2 | 2/2016 | |
| WO | WO-02069629 A2 | 9/2002 | |
| WO | WO-2006105480 A1 | 10/2006 | |
| WO | WO-2008030565 A2 | 3/2008 | |
| WO | WO-2008030565 A3 | 3/2008 | |
| WO | WO-2008051331 A2 | 5/2008 | |
| WO | WO-2008051331 A3 | 5/2008 | |

OTHER PUBLICATIONS

"U.S. Appl. No. 12/377,650, Response filed Sep. 23, 2013 to Final Office Action dated Jun. 27, 2013", 20 pgs.
"U.S. Appl. No. 12/377,650, Advisory Action dated Sep. 10, 2013", 3 pgs.
"U.S. Appl. No. 12/377,650, Examiner Interview Summary dated May 20, 2013", 2 pgs.
"U.S. Appl. No. 12/377,650, Examiner Interview Summary dated Jul. 24, 2013", 3 pgs.
"U.S. Appl. No. 12/377,650, Examiner Interview Summary dated Sep. 19, 2013", 3 pgs.
"U.S. Appl. No. 12/377,650, Final Office Action dated Jun. 27, 2013", 32 pgs.
"U.S. Appl. No. 12/377,650, Non Final Office Action dated Feb. 28, 2013", 34 pgs.
"U.S. Appl. No. 12/377,650, Notice of Allowance dated Nov. 22, 2013", 10 pgs.
"U.S. Appl. No. 12/377,650, Preliminary Amendment filed Feb. 16, 2009", 3 pgs.
"U.S. Appl. No. 12/377,650, Response filed Feb. 18, 2013 to Restriction Requirement dated Jan. 25, 2013", 9 pgs.
"U.S. Appl. No. 12/377,650, Response filed May 6, 2013 to Non Final Office Action dated Feb. 28, 2013", 17 pgs.
"U.S. Appl. No. 12/377,650, Response to Final Office Action dated Jun. 27, 2013", 15 pgs.
"U.S. Appl. No. 12/377,650, Restriction Requirement dated Jan. 25, 2013", 5 pgs.
"U.S. Appl. No. 12/377,653, Non Final Office Action dated Oct. 9, 2012", 9 pgs.
"U.S. Appl. No. 12/377,653, Notice of Allowance dated Feb. 15, 2013", 11 pgs.
"U.S. Appl. No. 12/377,653, Preliminary Amendment filed Feb. 16, 2009", 3 pgs.
"U.S. Appl. No. 12/377,653, Response filed Jan. 9, 2013 to Office Action dated Oct. 9, 2012", 11 pgs.
"U.S. Appl. No. 12/377,653, Response Filed Sep. 12, 2012 to Restriction Requirement dated Aug. 13, 2012", 10 pgs.
"U.S. Appl. No. 12/377,653, Restriction Requirement dated Aug. 13, 2012", 5 pgs.
"U.S. Appl. No. 14/184,371, Notice of Allowance dated Mar. 8, 2016", 13 pgs.
"U.S. Appl. No. 14/184,371, Preliminary Amendment filed May 13, 2014", 9 pgs.
"U.S. Appl. No. 15/159,556, Notice of Allowance dated Aug. 24, 2017", 9 pgs.
"U.S. Appl. No. 15/159,556, Preliminary Amendment filed Jul. 19, 2016", 9 pgs.
"U.S. Appl. No. 15/851,168, Notice of Allowance dated Aug. 6, 2019", 10 pgs.
"U.S. Appl. No. 15/851,168, Preliminary Amendment Filed Mar. 19, 2018", 8 pgs.
"U.S. Appl. No. 16/673,015, Final Office Action dated Dec. 28, 2020", 21 pgs.
"U.S. Appl. No. 16/673,015, Non Final Office Action dated Sep. 14, 2020", 18 pgs.
"U.S. Appl. No. 16/673,015, Notice of Allowance dated Apr. 2, 2021", 6 pgs.
"U.S. Appl. No. 16/673,015, Preliminary Amendment filed Mar. 26, 2020", 8 pgs.
"U.S. Appl. No. 16/673,015, Response filed Feb. 26, 2021 to Final Office Action dated Dec. 28, 2020", 11 pgs.
"U.S. Appl. No. 16/673,015, Response filed Dec. 11, 2020 to Non Final Office Action dated Sep. 14, 2020", 11 pgs.
"Australian Application Serial No. 2007309675, Examiner Report dated Apr. 6, 2011", 2 pgs.
"Australian Application Serial No. 2007309675, Office Action Response filed Oct. 17, 2011", 18 pgs.
"Australian Application Serial No. 2007309675, Response to Examiner Report dated Aug. 1, 2011", 19 pgs.
"Australian Application Serial No. 2007309675, Subsequent Examiners Report dated Aug. 18, 2011", 2 pgs.
"Australian Application Serial No. 2007292910, Examiner Report dated Apr. 4, 2011", 2 pgs.
"Australian Application Serial No. 2007292910, First Examiner Report dated Mar. 12, 2010", 2 Pgs.
"Australian Application Serial No. 2007292910, Notice of Acceptance dated Oct. 25, 2011", 3 pgs.
"Australian Application Serial No. 2007292910, Office Action dated Aug. 3, 2011", 3 pgs.
"Australian Application Serial No. 2007292910, Office Action Response Filed Jul. 6, 2011", 9 pgs.
"Australian Application Serial No. 2007292910, Office Action Response dated Mar. 11, 2011", 20 pgs.
"Australian Application Serial No. 2007309675, First Examiner Report dated Mar. 17, 2010", 2 pgs.
"Australian Application Serial No. 2007309675, Office Action Response dated Mar. 17, 2011", 22 pgs.
"Australian Application Serial No., Examiner's Report Response filed Sep. 29, 2011", 12 pgs.
"Australisan Application Serial No. 2007309675, Notice of Acceptance dated Nov. 11, 2011", 3 pgs.
"European Application Serial No. 07811705.8, Communication pursuant to Article 94(3) EPC dated Aug. 10, 2016", 5 pgs.
"European Application Serial No. 07811705.8, Extended European Search Report dated Oct. 8, 2010", 7 pgs.
"European Application Serial No. 07811705.8, Response filed Apr. 27, 2011 to Extended European Search Report dated Oct. 26, 2010", 13 pgs.
"European Application Serial No. 07811705.8, Response filed Dec. 6, 2016 to Communication pursuant to Article 94(3) EPC dated Aug. 10, 2016", 9 pgs.
"European Application Serial No. 07837881.7, Communication pursuant to Article 94(3) EPC dated Jan. 13, 2017", 6 pgs.
"European Application Serial No. 07837881.7, Extended European Search Report Filed Sep. 1, 2011", 18 pgs.
"European Application Serial No. 07837881.7, Extended European Search Report dated Oct. 20, 2010", 7 pgs.
"European Application Serial No. 07837881.7, Response filed Mar. 7, 2017 to Communication pursuant to Article 94(3) EPC dated Jan. 13, 2017", 6 pgs.
"European Application Serial No. 18204519.5, Extended European Search Report dated Apr. 8, 2019", 9 pgs.
"European Application Serial No. 18204519.5, Response filed Dec. 20, 2019 to Extended European Search Report dated Apr. 8, 2019", 13 pgs.
"International Application Serial No. PCT/US07/19527, International Search Report dated Apr. 18, 2008", 10 pgs.
"International Application Serial No. PCT/US2007/019527, International Preliminary Report on Patentability dated Mar. 19, 2009", 7 pgs.
"International Application Serial No. PCT/US2007/019554, International Preliminary Report on Patentability dated Mar. 19, 2009", 8 pgs.
"International Application Serial No. PCT/US2007/019554, Search Report dated Jul. 24, 2008", 6 pgs.

(56) References Cited

OTHER PUBLICATIONS

"International Application Serial No. PCT/US2007/019554, Written Opinion dated Jul. 24, 2008", 3 pgs.
"Japanese Application Serial No. 2009-527425, Notice of Allowance dated Oct. 30, 2012", with English translation, 6 pgs.
"Japanese Application Serial No. 2009-527425, Office Action dated Mar. 21, 2012", With English Translation, 6 pgs.
"Japanese Application Serial No. 2009-527425, Office Action dated Aug. 23, 2011", with English translation of claims, 6 pgs.
"Japanese Application Serial No. 2009-527425, Response filed Jun. 6, 2012 to Office Action dated Mar. 21, 2012", with English translation of claims, 10 pgs.
"Japanese Application Serial No. 2009-527425, Response filed Nov. 18, 2011 to Office Action dated Aug. 23, 2011", with English translation of claims, 11 pgs.
"Japanese Application Serial No. 2009-527428, Decision to Grant dated Jul. 3, 2012", with English translation, 6 pgs.
"Japanese Application Serial No. 2009-527428, Office Action dated Mar. 21, 2012", With English Translation, 4 pgs.
"Japanese Application Serial No. 2009-527428, Office Action dated Aug. 23, 2011", with English translation of claims, 9 pgs.
"Japanese Application Serial No. 2009-527428, Response filed Jun. 11, 2012 to Office Action dated Mar. 21, 2012", with English translation of claims, 9 pgs.
"Japanese Application Serial No. 2009-527428, Response filed Nov. 18, 2011 to Office Action dated Aug. 23, 2011", with English translation of claims, 8 pgs.
"Japanese Application Serial No. 2012-170940, Appeal Decision dated Dec. 8, 2015", with English translation, 4 pgs.
"Japanese Application Serial No. 2012-170940, Appeal filed Sep. 29, 2014", with English translation of claims, 11 pgs.
"Japanese Application Serial No. 2012-170940, Examiners Decision of Final Refusal dated Jun. 17, 2014", with English translation of claims, 5 pgs.
"Japanese Application Serial No. 2012-170940, Office Action dated Aug. 18, 2015", with English translation of claims, 6 pgs.
"Japanese Application Serial No. 2012-170940, Office Action dated Oct. 15, 2013", with English translation of claims, 11 pgs.
"Japanese Application Serial No. 2012-170940, Response filed Jan. 14, 2014", with English translation of claims, 7 pgs.
"Japanese Application Serial No. 2012-170940, Response filed Oct. 19, 2015 to Office Action dated Aug. 18, 2015", with English translation of claims, 4 pgs.
"Japanese Application Serial No. 2012-170940, Voluntary Amendment filed Aug. 29, 2012", with English translation of claims, 11 pgs.
"VOD TV Guide deployed", [Online]. Retrieved from the Internet: <URL: http://web.archive.org/web/20040820160855/http://www.advancedtelevision.com/specialreport/VOD/tvguide.html>, (Dec. 2001-Jan. 2002), 1 pg.
"European Application Serial No. 18204519.5, Communication Pursuant to Article 94(3) EPC dated Jun. 9, 2021", 5 pages.

\* cited by examiner

METHOD AND SYSTEM TO NAVIGATE VIEWABLE CONTENT

RELATED APPLICATIONS

This application is a continuation of U.S. patent application Ser. No. 16/673,015, filed on Nov. 4, 2019, which is a continuation of U.S. patent application Ser. No. 15/851,168, filed on Dec. 21, 2017, which is a continuation of U.S. patent application Ser. No. 15/159,556, filed on May 19, 2016, which is a continuation of U.S. patent application Ser. No. 14/184,371, filed on Feb. 19, 2014, which is a continuation of U.S. patent application Ser. No. 12/377,650, filed on Jan. 3, 2011, which is a U.S. National Stage Filing under 35 U.S.C. 371 from International Application Number PCT/US2007/019554, filed on Sep. 7, 2007 and published in English as WO 2008/030565 on Mar. 13, 2008, which claims the priority benefit of U.S. Provisional Application Ser. No. 60/842,735 filed on Sep. 7, 2006 and entitled "METHOD AND SYSTEM TO NAVIGATE MULTIMEDIA CONTENT" and of U.S. Patent Application Ser. No. 60/911,009 filed on Apr. 10, 2007 and entitled "METHOD AND SYSTEM TO SEARCH MULTIMEDIA CONTENT IN THE CONTEXT OF TELEVISION ENTERTAINMENT", which applications and publication are incorporated herein by reference in their entirety. This application is also related to commonly assigned PCT Application Number PCT/US2007/019527, filed Sep. 7, 2007, published in English as WO 2008/051331 on May 2, 2008, and entitled "METHOD AND SYSTEM TO SEARCH VIEWABLE CONTENT". This application is also related to the U.S. National Stage Filing which claims priority to PCT Application Number PCT/US2007/019527, filed on even date herewith. These applications and publication are incorporated herein by reference in their entirety.

TECHNICAL FIELD

This application relates to a method and system to navigate viewable content in the context of television entertainment.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of television entertainment, there is a new generation of viewers that has a high expectation of the level of entertainment to be enjoyed from television programming. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
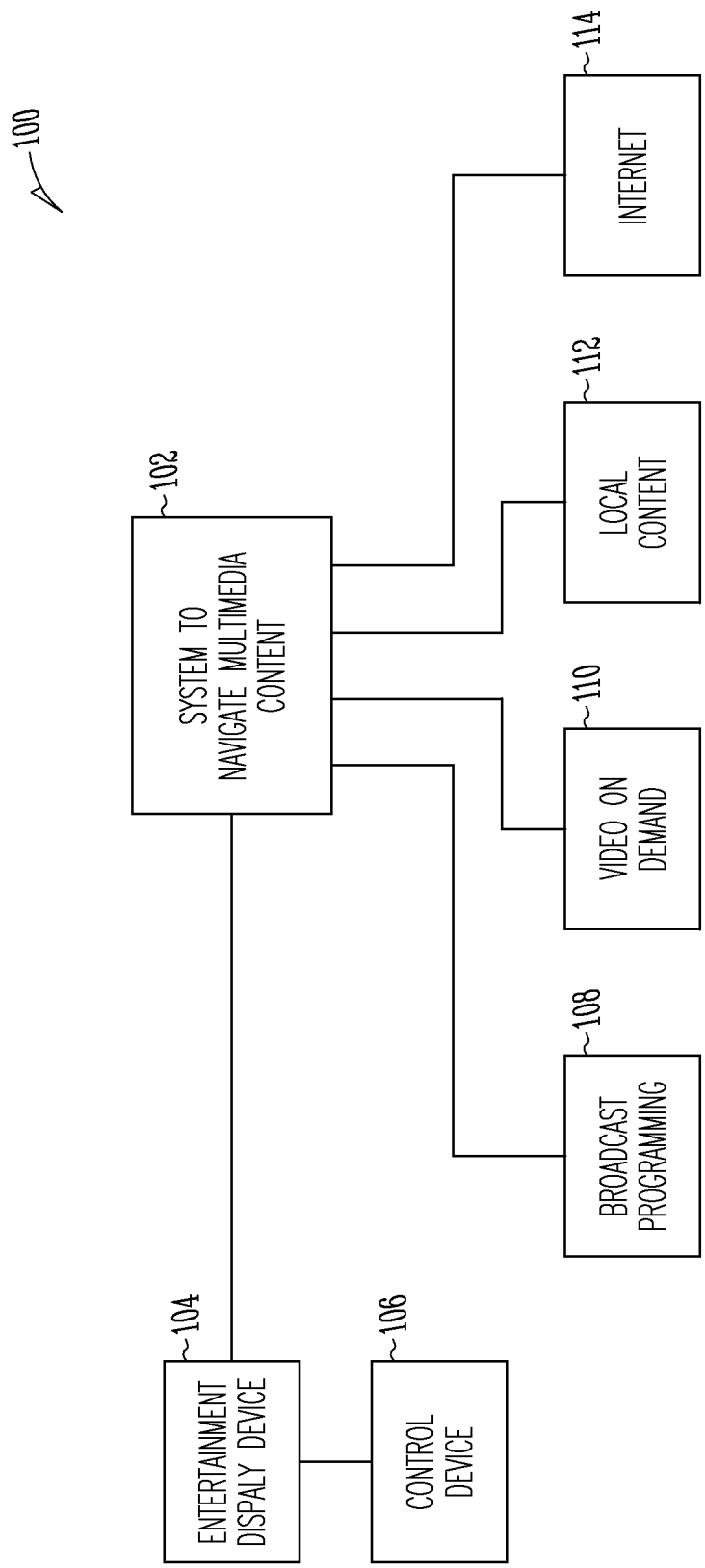
FIG. 1 illustrates an environment within which an example system to navigate viewable content may be implemented, in accordance with an example embodiment.

A method and system to navigate content available for viewing and to manage a viewer's choice is described. In the following description, for purposes of explanation, numerous specific details are set forth in order to provide a thorough understanding of an embodiment of the present invention. It will be evident, however, to one skilled in the art that the present invention may be practiced without these specific details. It is to be noted that the delivery mechanism for the content for viewing may be via a satellite, cable, Internet, local storage, a local network, mobile telephony, or any other content distribution network. Accordingly, the viewing device need not be a television set but may be any display unit of any device (including portable devices).

A system to navigate viewable content and to manage a viewer's may include a supermodal zoomable viewer interface (ZUI) (e.g., the interface may be selectively enlarged by zooming in, either literally or figuratively, by enabling specific selections) that may be utilized to assist viewers in navigating the wealth of potentially available viewable content in an efficient and enjoyable manner. An example interface may be configured to analyze a viewer's behavior over time and to provide a personalized experience in a world of nearly infinite content. In one example embodiment, the interface may be configured to utilize existing control keys on a remote control device, such as the directional keys and the select button, in order to access various aspects of the interface and the associated functionality. This functionality may include, e.g., a viewer interface to navigate to the programming of choice, to view recommendations based on the currently viewed content and/or the viewer's profile, as well as to permit viewers to search for specific content items. An example interface may contribute to enhancing viewer experience by providing a smooth transition between watching television and navigating for content and between different navigation techniques. For the purposes of this description, a feature or a combination of features to permit a viewer to access multiple modes in order to discover and navigate content and to link those modes to create a unified experience, may be referred to as supermodality. It will be noted that the term viewer may be understood broadly as any viewer of the system to navigate television content.

In one example embodiment, a method and system to navigate viewable content may be utilized in the following example scenario. A viewer just arrived home and started watching television. The viewer is channel surfing but cannot find anything adequate to watch. The viewer is stuck in the paradox of choice—too much choice to find something he really wants. By employing the example system to navigate viewable content (that may be referred to as a navigation system), the viewer is permitted to explore the variety of available viewable content by the simple use of the five standard remote control keys—the four directional keys (e.g., the arrow buttons) and the select key. The requests submitted in this manner may activate functionality to provide shortcuts to a variety of content navigation functions (e.g., to automatically engage a particular way of navigating), and thus may be referred to as "surfcuts," as navigating through content is sometimes referred to as "surfing."

In response to receiving a request associated with a directional key, the example navigation system determines which directional key was activated by the viewer and present the viewer with a so-called margin menu. A margin menu, in one example embodiment, is displayed in the margins of a viewing area (e.g., in the margins, or along the edges of video content, or at the periphery of a TV screen or any other viewing device) and may be associated with specific navigation-related functionality. For example, one margin menu may be dedicated to navigating broadcast channels, another—to navigating video-on-demand (VOD) or previously stored content. In one example embodiment, each item in the margin menu represents a content item that can be viewed. Some example margin menus are described further below. An interface based on margin menus may contribute to enhancing viewer experience by providing a smooth transition between watching television and navigating for content and between different navigation techniques.

A margin menu may be intuitively associated with a particular directional key such that a margin menu to be displayed in the upper portion of a display screen may be activated by an "Up" directional key, a margin menu to be displayed in the left portion of a display screen may be activated by a "Left" directional key, and so on. In one example embodiment, an interface for navigating viewable content may include a feature that permits a viewer to continue viewing the current content while, at the same time, previewing different content (e.g., the content selected via a margin menu choice). It will be noted, however, that in some embodiments there may not be a margin per se. In such situation, the main content may be resized in order to create space for the margin menu. An example margin menu may be displayed such that it does not obscure the content that a viewer is currently watching, while permitting a viewer to start navigating towards different viewable content. In some embodiments, where a margin menu is displayed on a mobile device, the content may be partially or fully obscured, depending on the screen size. A separate margin menu may be associated with each directional key on a viewer's remote control device. The margin menu may extend around the entire periphery of the viewing area or only a portion thereof.

In one example embodiment, the directional keys that are provided with a remote control device may be utilized to navigate margin menus, with or without employing a specialized control key to permit content navigation and selection. For example, once a margin menu has been engaged, a viewer may use directional keys on a remote control device to move between different content items (e.g., by pressing the "Up" and "Down" directional keys if the margin menu is displayed along the left or the right edge of the screen). The "Select" key on a remote control device, in one example embodiment, may be used to cause the currently viewed content to be replaced by the selected content.

In one example embodiment, a margin menu associated with a particular directional key may be displayed in such a way that it reinforces a viewer's key-menu association. For example, a margin menu associated with an "Up" directional key may be displayed near the top edge of the viewing area, a "Down" directional key may be displayed near the bottom edge of the viewing area, a "Left" directional key may be displayed near the left edge of the viewing area, and a "Right" directional key may be displayed near the right edge of the viewing area. It will be noted, that a variety of remote control devices may be utilized with the system to navigate viewable content, including, e.g., controllers designed for games, that may have more than four directional keys. Using points of a compass, such controllers may have directional keys labels as "N", "NE", "E", "SE", "S", "SW", "W", and "NW," and these directional keys may also be used by the system to permit viewers to navigate through viewable content.

In one example embodiment, an example navigation system may be configured to present an expanded navigation interface (e.g., a navigation grid) associated with some or all of the margin menu to provide a more advanced discovery mode. A respective expanded interface for a margin menu may be requested by pressing the same directional key a second time when the margin menu is shown.

In order to exit from viewing a margin menu, a viewer may press the directional key opposite from the key that engaged the margin menu. For example, a viewer may bring up a left margin menu by pressing the left directional key and then exit from viewing the left margin menu by pressing the right directional key. According to one example embodiment, a viewer may also exit by pressing some other key as well, such as "Back", "Exit," or any other key. It will be appreciated that the specific interface used to navigate a margin menu may vary from one viewing device to another. For example, when viewing content on a computer system, directional keys of a keyboard may be used. When viewing content on a mobile device, numerical keys may be used, and so on.

A margin menu may be navigated using the direction keys at 90 degrees to the directions keys used to invoke and exit it. For example, a viewer may bring up the left margin menu by pressing the "Left" directional key and then navigate between the choices within the margin menu using the "Up" and "Down" directional keys. Each item in the margin menu may have associated "Preview" and "Select" options. The "Preview" option may permit a viewer to visually access the content that is different from the currently viewed content, while continuing to display the currently viewed content. In one example embodiment, when a content item is selected from a margin menu, e.g., by activating the "Select" key on a remote control, the selected content item replaces the currently viewed content.

A system to navigate multimedia content, in some example embodiments, may be implemented to include modules to offer content recommendations, to process explicit search requests, to present broadcast programs, video on demand content, Internet content, as well as previously stored content, in a manner suitable for navigating. An example system to navigate viewable content in the context of television entertainment may be described with reference to FIG. 1.

FIG. 1 illustrates an environment 100 within which an example system to navigate viewable content may be implemented. The environment 100 includes a system to navigate viewable content 102 in communication with an entertainment display device 104 and a control device 106. In one example embodiment, the entertainment display device 104 is a television set, and the control device 106 is a remote control device that may be used for switching between television channels, for example. The system to navigate viewable content 102 is shown as having access to broadcast programs 108, video on demand programs 110, as well as to local content 112 and Internet content 114. An example system to navigate viewable content in the context of television entertainment may be described with reference to FIG. 2.

Figure 2:
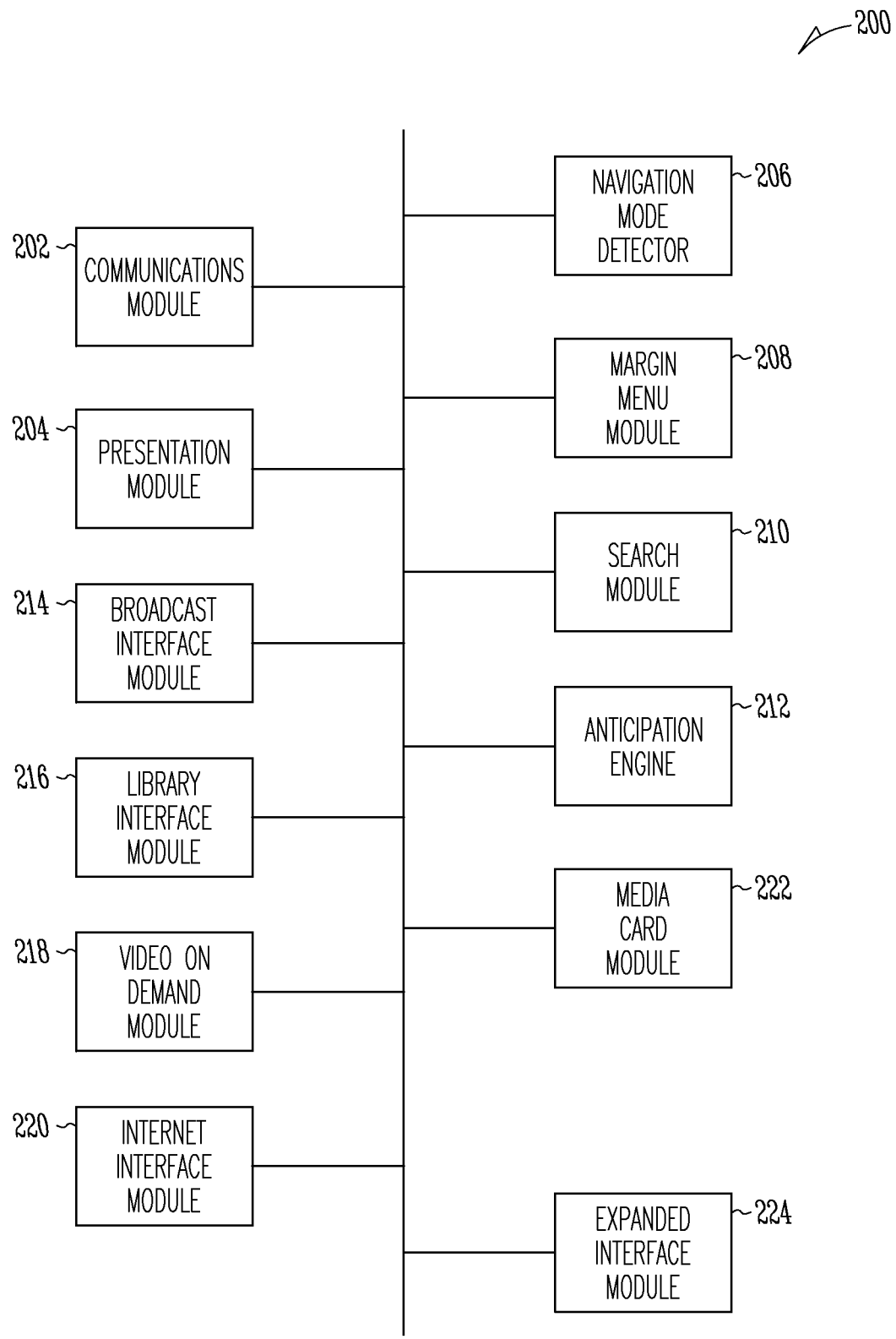
FIG. 2 is a block diagram illustrating a system, in accordance with an example embodiment, to navigate viewable content.

FIG. 2 illustrates an example system 200 to navigate viewable content. The system 200 includes a communications module 202, a presentation module 204, and a margin menu module 208. The communications module 202 may be configured to receive requests from a viewer, e.g., content search, content selection, and content navigation requests. As mentioned above, the requests may be received from a television remote control device. The presentation module 204 may be configured to display the content item, selected by a viewer, in a format suitable for viewing. For example, the presentation module 204 may cooperate with the margin menu module 208 to present different margin menus in response to viewer's requests associated with directional keys on a remote control device.

The margin menu module 208, in one example embodiment, may include a plurality of modules, each of which being associated with its respective margin menu. Example margin menus are described further below. The presentation module 204 may also be configured to present to a viewer a media card associated with a particular content item, utilizing a media card module 222. A media card, in one example embodiment, is an interactive presentation interface to provide additional information regarding the content item, including a list of keywords, stored as metadata associated with the content item. The margin menu module 208 may be configured to activate a margin menu associated with the determined navigation mode. The activating of a margin menu indicates to the viewer that a certain navigation mode has been activated. A margin menu may be presented by the margin menu module 208 along one of the margins of a display screen, while permitting viewing of the main content.

The margin menu module 208, in one example embodiment, cooperates with a navigation mode detector 206. The navigation mode detector 206 may be configured to determine a navigation mode associated with a directional key associated with a request received by the communications module 202. The navigation mode detector 206 may then communicate the navigation mode information to the margin menu module 208 so that the margin menu module 208 displays the appropriate margin menu. An example system 200 to navigate viewable content may be configured to support a variety of navigation modes and associated margin menus. Some example margin menus include a broadcast menu, a library menu, a search, menu, and a recommendation menu. Some of the example menus are discussed in greater detail further below.

In one example embodiment, the system 200 to navigate viewable content includes a search module 210 configured to locate the requested content item based on a search term associated with the search request and an anticipation engine 212 to drive recommendations suggested to a viewer. The search module 210, in one example embodiment, is configured to cooperate with a text entry module permits a viewer to enter search terms in a text format and a search term detector to determine a search term associated with a viewer's request. A text entry module may cooperate with a dictionary module to generate suggested search terms and to present a reduced set of letter selections based on an incomplete text entry by the viewer. A disambiguation module may be provided with the search module 210 to generate a more precise search term based on the search term provided with the viewer's request. The viewer may then be provided with an option to select the generated more precise search term to be used for searching. The example system 200 may also include a search refinement module to permit filtering of the content items located by the search module 210.

As mentioned above, the content available for viewing on an entertainment display device may include television programming, locally stored content, video on demand, content available on a local network, as well as content accessible via the Internet. The system 200, in one example embodiment, includes a broadcast interface module 214 to access television programming, a library interface module 216 to access locally stored content, a video on demand module 218 to access video on demand, and an Internet interface module 220 to access Internet content. It will be noted that some or all of the modules of the system 200 may be considered to be a system to navigate viewable content. An expanded interface module 224 may be configured to detect a request for an expanded navigation interface associated with the currently active margin menu and to activate the associated expanded interface. Example operations performed by the system 200 may be described with reference to FIG. 3.

Figure 3:
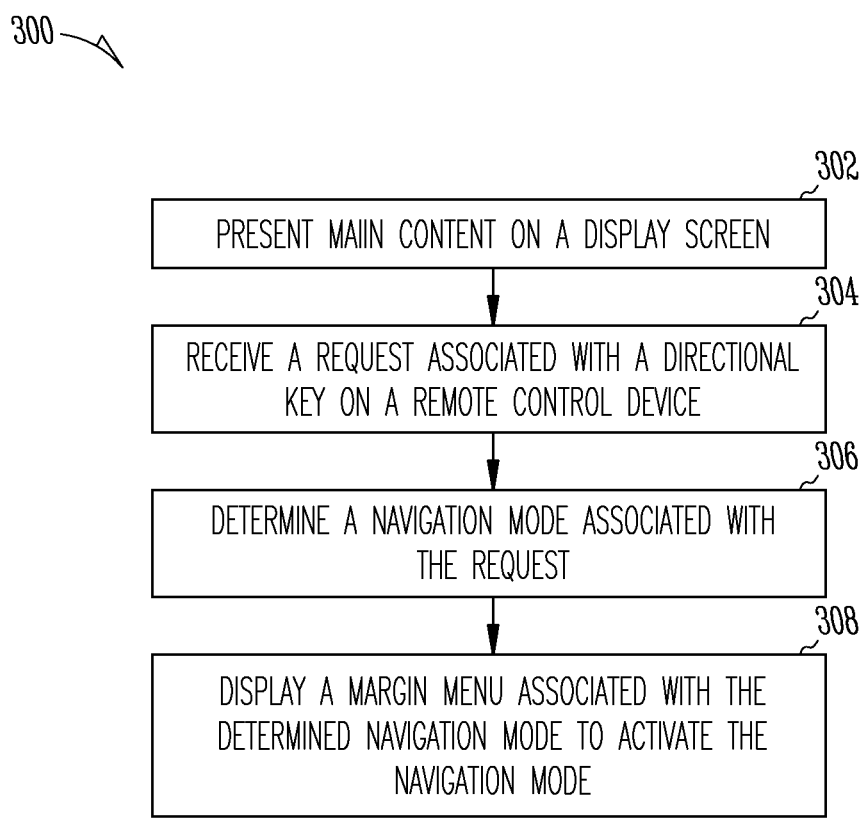
FIG. 3 is a flow chart illustrating a method, to navigate viewable content.

FIG. 3 illustrates is an example method 300 to navigate viewable content. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 3, the method 300 commences with operation 302, where the presentation module 204 presents main content on a display screen. At operation 304, the communications module 202 of the system 200 receives a request associated with a directional key on a remote control device. It will be noted that in one example embodiment the display device is a television screen, and the remote control device is a television remote control device. In response to receiving the request, the navigation mode detector 206 processes the request to determine a navigation mode associated with the first request, at operation 306. At operation 308, the margin menu module 208 activates a margin menu associated with the determined navigation mode and the presentation module 204 displays the margin menu along one of the margins of the viewer's display screen. The margin menu may be displayed such that the main content is not obstructed from view.

As mentioned above, an example system to search viewable content may be configured to permit a viewer to invoke functionality utilizing directional keys that are intuitively associated with the direction designated by a directional key. For example, if a particular directional key is used to activate a particular navigation mode, a directional key associated with the opposite direction is used to deactivate the navigation mode. On the other hand, engaging the same directional key again, causes the activation of an expanded version of that navigation mode (e.g., the activation of a grid associated with that navigation mode). Example operations illustrating these features may be discussed with reference to FIG. 4.

Figure 4:
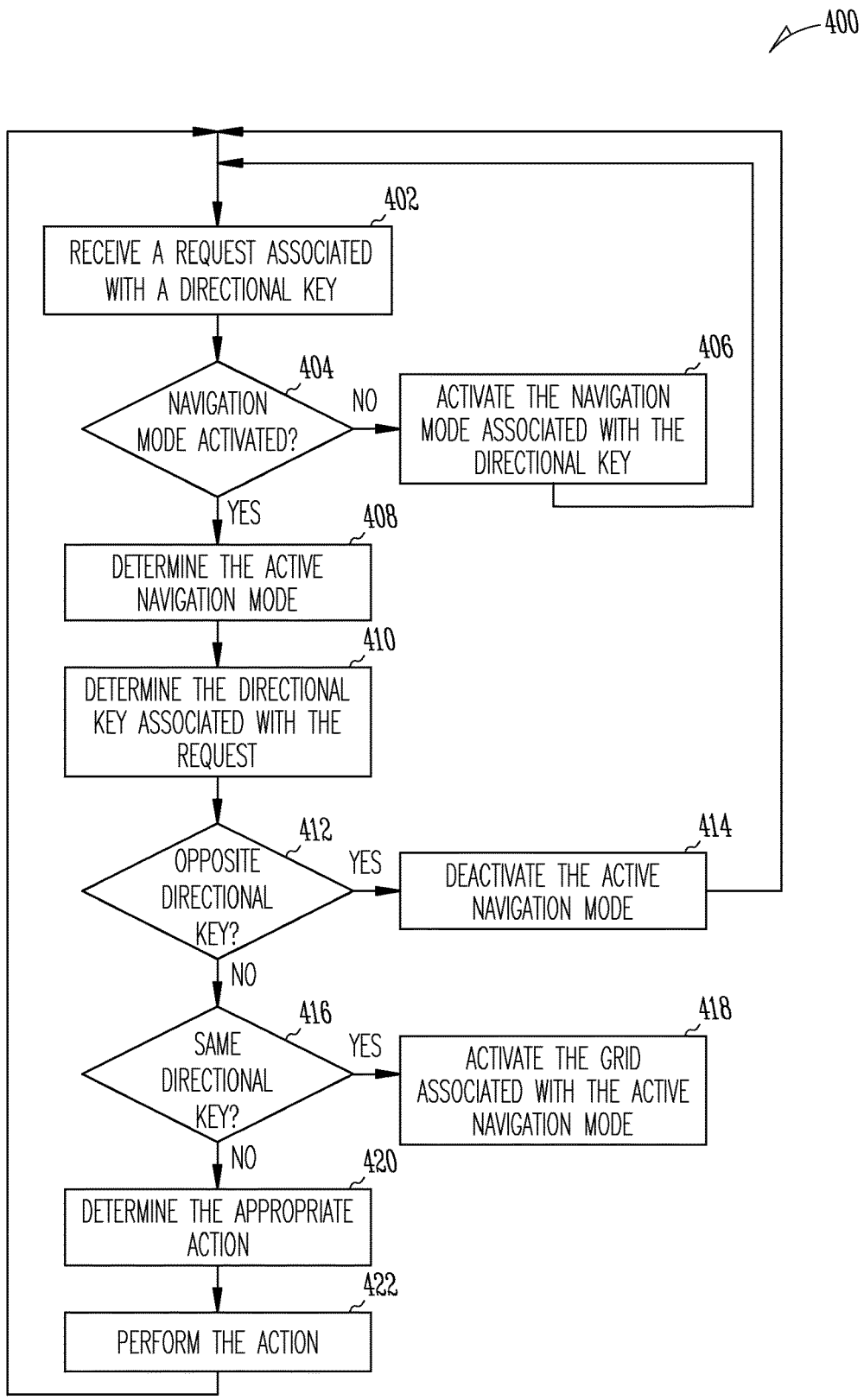
FIG. 4 is a flow chart illustrating a method, in accordance with an example embodiment, that includes additional operations that may be performed in one example implementation of a method to navigate viewable content.

FIG. 4 illustrates a method 400 that includes additional operations that may be performed in one example implementation of a method to navigate viewable content. The example method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 4, the method 400 commences with operation 402, where the communications module 202 of the system 200 receives a request associated with a directional key on a control device. At operation 404, the navigation mode detector determines whether a navigation mode has already been activated. If it is determined that a navigation mode has not been activated, the navigation mode detector 206 identifies the navigation mode associated with the directional key and the identified navigation mode is activated at operation 406. If it is determined that a navigation mode has already been activated, the navigation mode detector 206 identifies the active navigation mode at operation 408. The directional key associated with the active navigation mode is determined at operation 410.

If it is determined, at operation 412, that the directional key associated with the request received at operation 402 is the opposite of the directional key associated with the active navigation mode, the active navigation mode is deactivated at operation 414. If it is determined, at operation 412, that the directional key associated with the request received at operation 402 is the same as the directional key associated with the active navigation mode, the presentation module 204 displays, at operation 418, an associated grid to permit the viewer access to expanded functionality associated with the active navigation mode. If it is determined, at operation 412, that the directional key associated with the request received at operation 402 is not the same as the directional key associated with the active navigation mode, an appropriate associated action is determined at operation 420, and the action is performed at operation 422.

As mentioned above, one example of a margin menu is a broadcast margin menu. The broadcast margin menu, in one example embodiment, may be activated by the "Down" directional key on a remote control device and may be displayed at the bottom of the viewer's screen. The broadcast margin menu may permit a viewer to see what TV programs are available on other channels. Each item in the on broadcast margin menu may have associated with "Preview" and "Select" (or "OK") options. The "Preview" option may permit a viewer to visually access a desired broadcast channel, while continuing to display the currently viewed content. In one example embodiment, a viewer may be permitted to see other channels without obscuring the currently viewed content. The "Select" option, in one example embodiment, causes the currently viewed content to be replaced by the selected broadcast channel.

Figure 5:
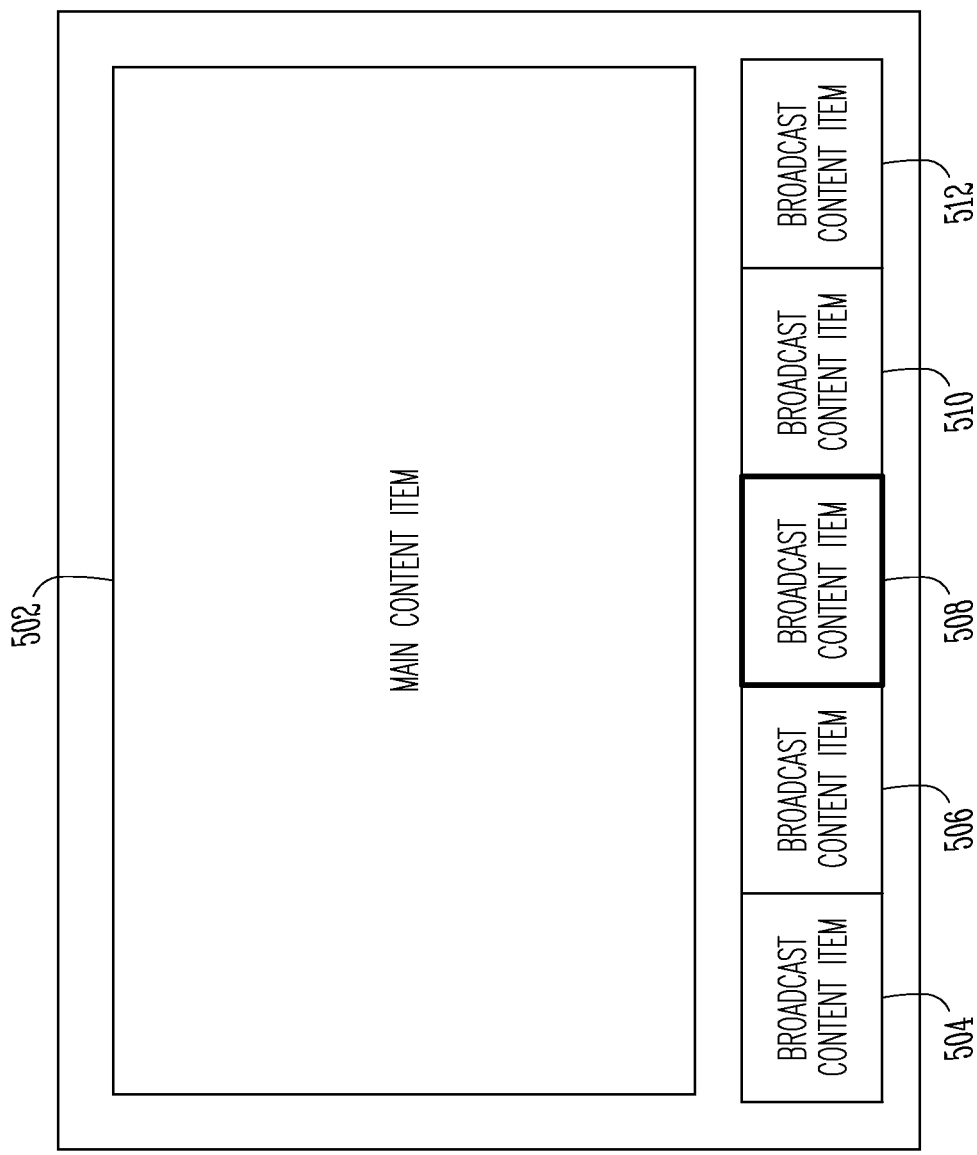
FIG. 5 illustrates a broadcast margin menu, in accordance with an example embodiment.

An example broadcast margin menu is illustrated in FIG. 5. As shown in FIG. 5, a main content item 502 is presented to occupy the larger portion of a display area 500. Content items 504-512 that represent other broadcast content item available for viewing are presented in the form of a margin menu—the broadcast margin menu—displayed along the right margin of the display area 500.

As shown in FIG. 5, the content item 508 is displayed as highlighted or accentuated, in order to draw the viewer's attention as a recommended item. The highlighting may be accomplished in a variety of ways. For example, the program title may be displayed in a color different from or brighter than the title color of the other menu items. In one embodiment, the recommended content item from the menu may be presented as streaming video, while the rest of the menu items may be presented as still images.

Figure 6:
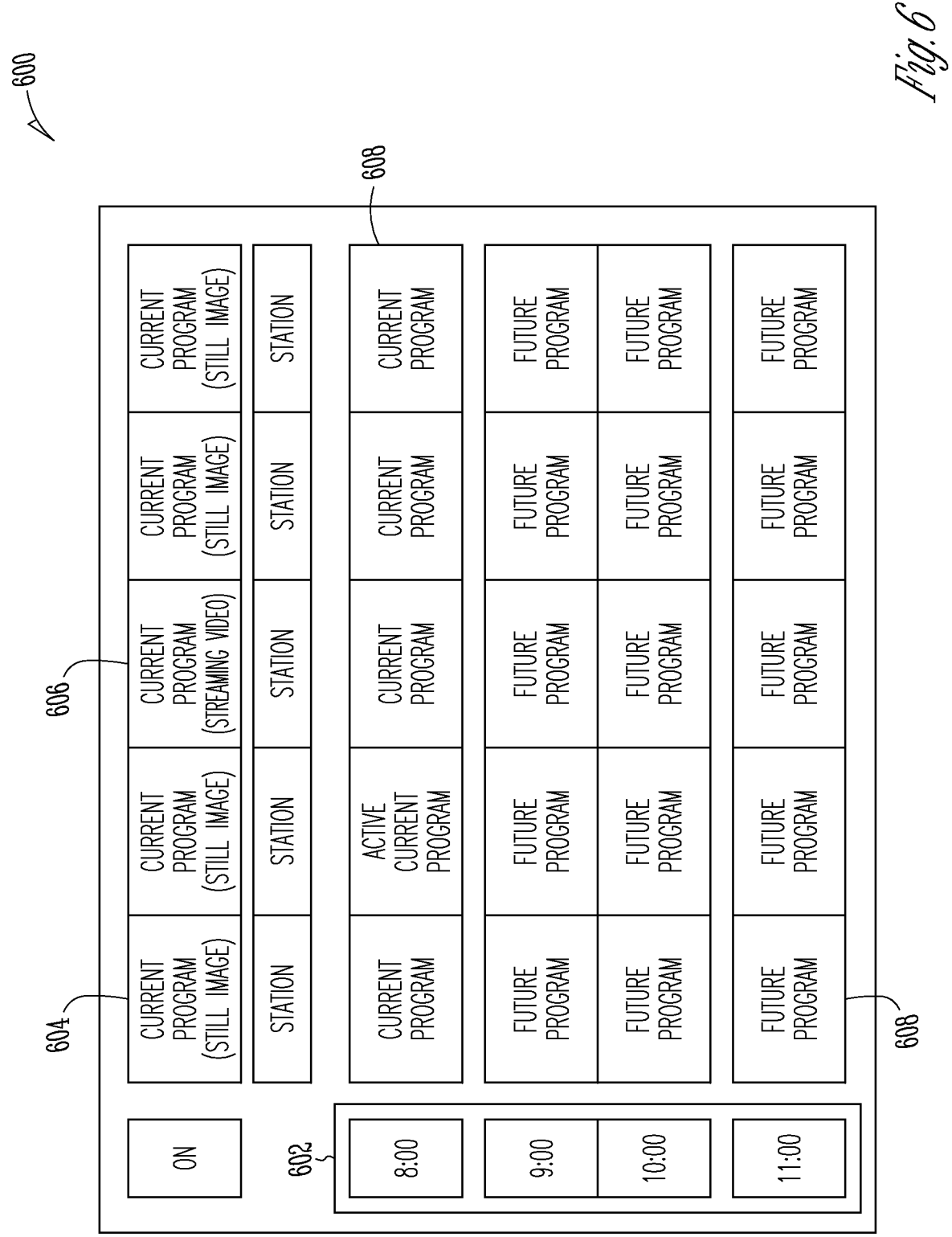
FIG. 6 illustrates a broadcast grid, in accordance with an example embodiment.

In one example embodiment, a viewer may be permitted to select and view a program from the broadcast margin menu, or, alternatively, the viewer may be permitted to access a so-called broadcast grid associated with the broadcast margin menu. FIG. 6 illustrates a broadcast grid 600, in accordance with an example embodiment. In one example embodiment, the broadcast grid is a traditional linear TV grid, which may include some features of a conventional TV grid. A TV grid may be displayed such that the channels information runs across the top of the viewer's screen (e.g., areas 604, 606, and 608) while the time, in area 602, runs down the side of the viewer's screen. As shown in FIG. 6, thumbnail images from the broadcast menu, e.g., images that may be presented in areas 604 and 606, are kept at the top of the screen so the viewer can easily see what is currently playing on a channel as they page through the guide. In one example embodiment, the titles of recommended broadcast programs presented within the body of the grid may be visually emphasized, e.g., with a subtle colored highlight. The anticipation engine 212 may be configured to determine which broadcast programs should be recommended in this manner, based on the viewer's personal profile and viewing habits.

Figure 7:
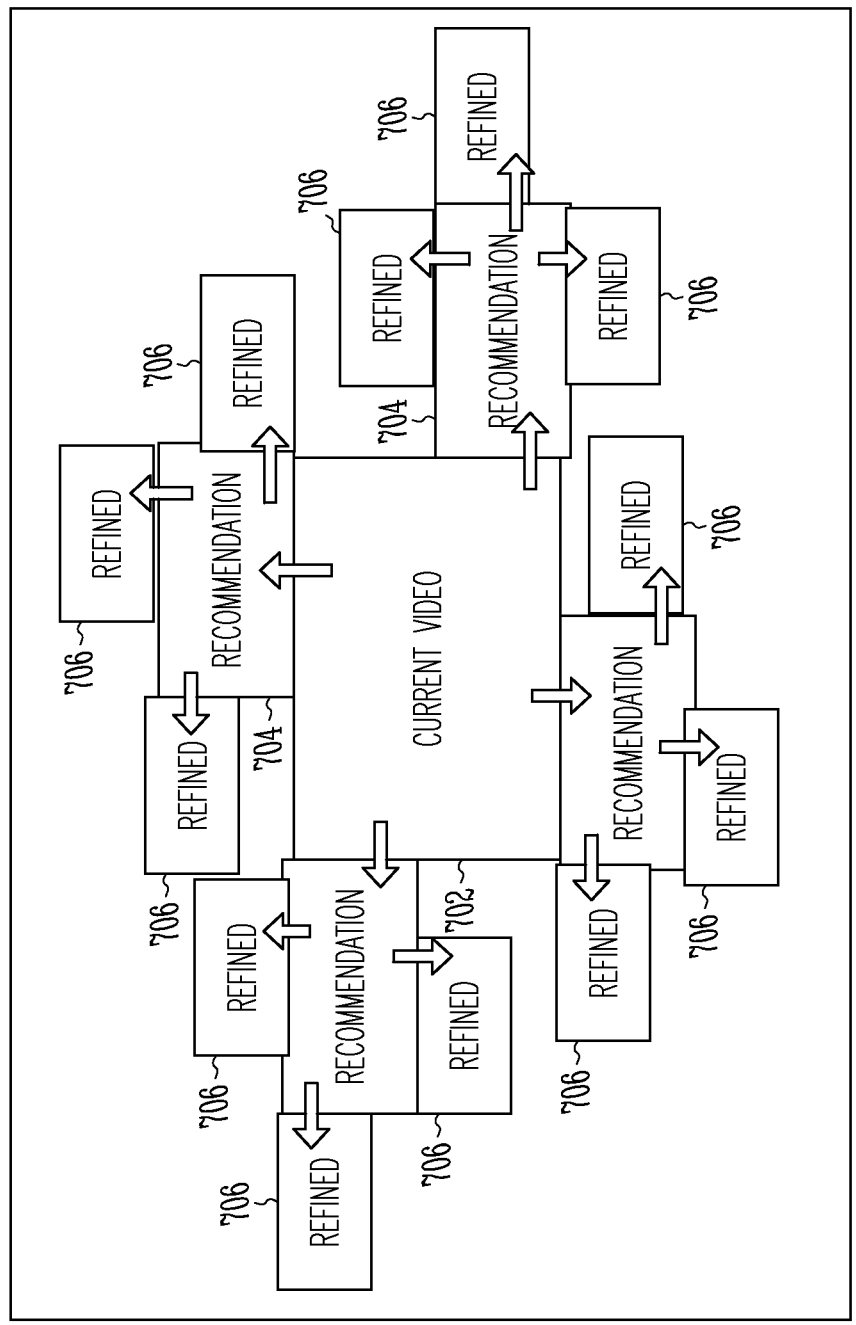
FIG. 7 illustrates a recommendation grid, in accordance with an example embodiment.

It will be appreciated that an expanded interface may be provided on any display device. The broadcast grid may be accessed by the viewer by pressing the same button that was used to access the broadcast margin menu while the broadcast margin menu is visible. Within the broadcast grid, a viewer may be permitted to not only navigate by content, but also by the channel names or brands. So as with any other content item, a viewer may bring up a to view information associated with a particular channel, to search based on that channel, to make recommendations based on the channel brand, or to save content associated with the channel. Example media card is described further below with reference to FIG. 7.

In one example embodiment, each content item associated with a particular channel in the broadcast margin menu (or in a broadcast grid) may be displayed utilizing a still image or streaming video. When the channels in the broadcast margin menu or in a broadcast grid are represented as streaming videos, a viewer may be permitted to actually sample the channels' content directly through these individual screens. In one example embodiment of the broadcast grid, the text associated with different TV programs may be presented as having different color, brightness, or different font size, or any combination of the above, to indicate a recommendation generated by the anticipation engine 212. Thus, while a viewer is presented with information associated with several different channels, the viewer may be capable of quickly identifying a TV program that is of most interest to her.

As mentioned above, another margin menu is a search margin menu. In one example embodiment, the search menu that may be presented near the right margin of the viewer's screen, displays content items from a previously executed search. The search margin menu may be activated by the "Right" directional key on a remote control device. A viewer may utilize the search menu to access a content item found in the last search performed. Each item in the on search margin menu may have associated "Preview" and "Select" (or "OK") options. The "Preview" option may permit a viewer to visually access a desired content item, while continuing to display the currently viewed content. In one example embodiment, a viewer may be permitted to see other content items from a search without obscuring the currently viewed content. The "Select" option, in one example embodiment, causes the currently viewed content to be replaced by the selected content item. A viewer can also initiate a new search by typing or selecting a search term. Once the search term has been determined, the search module 210 may locate one or more relevant content items based on the determined search term. The presentation module 204 may then present to the viewer the located content item. In one example embodiment, the located content item is presented to the viewer as a so-called source content item. Designating a content item to be the source item indicates to the associated content navigation system that metadata associated with the content item may be utilized to locate further search results or recommendations.

In one example embodiment, in response to requesting a search, a viewer is presented with one or more terms reflecting more precise meanings of the search term determined from the search request. A process to determine a more precise meaning of the search term may be referred to as disambiguation. For example, if the search term is "Disney," the search may produce a large number results. The viewer may be permitted to look at these individual content items within the search results or use mechanisms to refine the search by choosing a disambiguated meaning of the search term, such as "Walt Disney" or "Disney World", with each results set reduced automatically as the different meanings are selected.

Another example mechanism to refine or filter the search results is to present the viewer with an option to select a particular keyword, tag, category, or a type of content. For example, the list of content items produced by the search based on "Disney" may be filtered further based on the type of content associated with "animals" or only content that are TV series. The search results can be filtered multiple times, reducing the search result set with each filter by selecting different terms.

One example interface is single screen faceted browsing, where a list of filter terms is presented in multiple lists in the same interface as the search result list. One list of terms may be content categories and another list of terms may be content specific keywords/tags. In one example embodiment, moving between the terms and selecting terms from the lists allows the search results to be filtered/pivoted. The viewer may navigate between the search results list and search term lists using the "Left" and "Right" directional keys and navigate up and down the lists using the "Up" and "Down" directional keys. The search results list may contain images, text, or video to identify the associated content in the search result set.

One example of a search results list is a "lightbox" model, where a search result is just the title of a content item except for the search item that has focus, which would be expanded in size to contain a thumbnail video or a still image or expanded text. In one example embodiment, the pool of content utilized to generate a list of search results includes broadcast content, on-demand content, Internet content, content stored on a local network, as well as any other type of content that may be viewable on a television set, or any other display device.

In one example embodiment, the system to navigate viewable content may be configured to provide other margin menus in addition to the broadcast margin menu and the search margin menu. Other margin menus may include a library margin menu, and a recommendation margin menu. As mentioned above, the system may be configured to present a navigation grid associated with some or all of the margin menus to provide a more advanced discovery mode.

The library margin menu, in one example embodiment, permits a viewer to access content, both for locally sourced content (e.g., PVR), and remotely sourced content (e.g., video on demand, content via Internet-based distribution, content on a local network etc.). The library margin menu, in one example embodiment, may be activated by the "Left" directional key on a remote control device and may be displayed near the left margin of the viewer's screen. As mentioned earlier, with respect to margin menus in general, once the library margin menu has been engaged, a viewer may use directional keys on a remote control device to move between different content items (e.g., by pressing the "Up" and "Down" directional keys). The "Select" key, activated on a remote control device, in one example embodiment, causes the currently viewed content to be replaced by the selected content. The library margin menu, in one example embodiment may be associated with a library grid, which is described further below. In one example embodiment, the content items that may be accessed utilizing the library menu and the library grid are the content items that has been designated by a viewer as being of interest to the viewer.

In one example embodiment, the "Up" directional key on a remote control device may be utilized to engage a recommendations margin menu. The recommendations margin menu may be associated with an engine that may be configured to intelligently anticipate a viewer's choice of particular content. Thus, such an engine may be termed an anticipation engine, which may be provided with the system 200 to navigate viewable content, illustrated in FIG. 2. The recommendations generated by the anticipation engine 212 may be based, for example, on the specific content that the viewer is currently watching, a profile of the viewer including viewing habits, environmental context, general popularity, collaborative filtering or any combination of the preceding factors. A margin menu with several recommended content items may appear near the top margin of the viewer's screen in response to the control key. The viewer may then select any of the recommended content items, either for preview or for committed viewing. Alternatively, the viewer may choose to solicit further recommendations by engaging a so-called full committed interface (or entering a committed recommendations mode). While in the example committed recommendations mode, a viewer may request recommendations from the anticipation engine 212 based not on the originally viewed content but rather based on the selected recommended content item. In response, the anticipation engine 212 may provide further recommendations to be displayed by the navigation interface.

It will be noted, that the recommendations mode that permits viewers to view recommendations and solicit more targeted recommendations may be accessed from any other margin menu, navigation grid, media card, or any other component of the viewer interface. In one example embodiment, a viewer may be presented simultaneously with recommendations based on the originally viewed content and with recommendations based on the selected recommended content item, as well as on the profile of the viewer. The content item that is selected to be the basis for a group of recommended content items may be called a source item. For example, while the system is operating in the committed recommendations mode, a source item (e.g., a source video) may be displayed along with two recommended content items displayed either side of it. A viewer may be permitted to navigate with the "Left" and "Right" directional keys to either of those content items. If a viewer navigates to a recommended content item and selects it, the item may be then brought into focus and displayed in the center of the viewer's screen, as the new source content item, surrounded by two other recommendations. A viewer may navigate with the "Up" directional keys to retain the current source content and replace the two recommended content items with two new recommendations based on the same source item. A viewer may navigate with the "Down" directional keys to return to a previous source item. The recommendations may be displayed as still images, while the source item may be displayed as a streaming video. Data about the recommendations and the source item may be displayed with images, video, or text, for example, title. For a recommendation item, this data may also include the tag/keyword common to the recommendation item and source item that had the most influence on the recommendation being made.

An example alternative implementation of a committed recommendation mode is so-called fractal navigation, where a directional key may be used to designate a recommended content item as a new source content item, while maintaining the previous choices visually available. The resulting hierarchy of recommendations, illustrated in FIG. 7, may have an appearance of a fractal, thus the term "fractal navigation." In FIG. 7, the initial source item 702 is presented with four recommended items 704. Each recommended item 704 may, in turn serve as source content items and be presented with one or more refined recommendation items 706. Each new set of recommendations may be based on the respective source content item and the viewer's personal profile. For example, if the new source content item (e.g., a movie) is identified by the system as more scary than the old source content item, the resulting recommendations may include movies that are more scary than the new source item.

To illustrate an example use case of the recommendations mode, as a viewer follows the direction of a recommendation, the new recommendation in the same direction may have the same link, creating an association between the direction and the tag/keyword while the same direction is followed. In one example embodiment, the recommended content items may be selected from a variety of sources, such as broadcast television, the content on the viewer's PVR, the content available over the Internet, content available from a local network(s), as well as from any interactive, dynamic or Internet Protocol (IP) based content.

The anticipation engine 212, in one example embodiment, may utilize a variety of criteria in order to generate recommendations for a particular viewer. An example criteria may include the viewer's consumption statistics or viewing behavior, e.g., what a viewer has actually watched in the past. Another criterion that may be used by the anticipation engine 212 is a viewer's environment, e.g., the current time of day, the viewer's geographic location, or the type of the viewer's display device (e.g., a TV set which may be a standard definition TV set or a high definition TV set). Furthermore, the 212 may utilize data that may be indicative of the viewer's mood. For example, information pertaining to how hard the viewer is pressing the remote control buttons and how long the viewer has lingered on each content item may provide an indication of the viewer's mood. Thus, the anticipation engine 212 may be configured to utilize a viewer's environment and mood indicators, in addition to utilizing the viewer's consumption patterns, in order to generate recommendations. It will be noted that, in one example embodiment, the anticipation engine 212 may utilize a variety of recommendation techniques. For example, the content presented to a viewer as related to the source content item may be shared from a social network and use collaborative filtering.

In one example embodiment, a viewer may be presented with reasoning behind recommendation, e.g., the name of the actor, a category, a particular keyword, etc. The recommendations may be based, for example, on one or more characteristics of the source content item, on the viewer's personal profile, or on a combination of both. Example operations performed by the system 200 while the recommendation mode is active, may be described with reference to FIG. 8.

Figure 8:
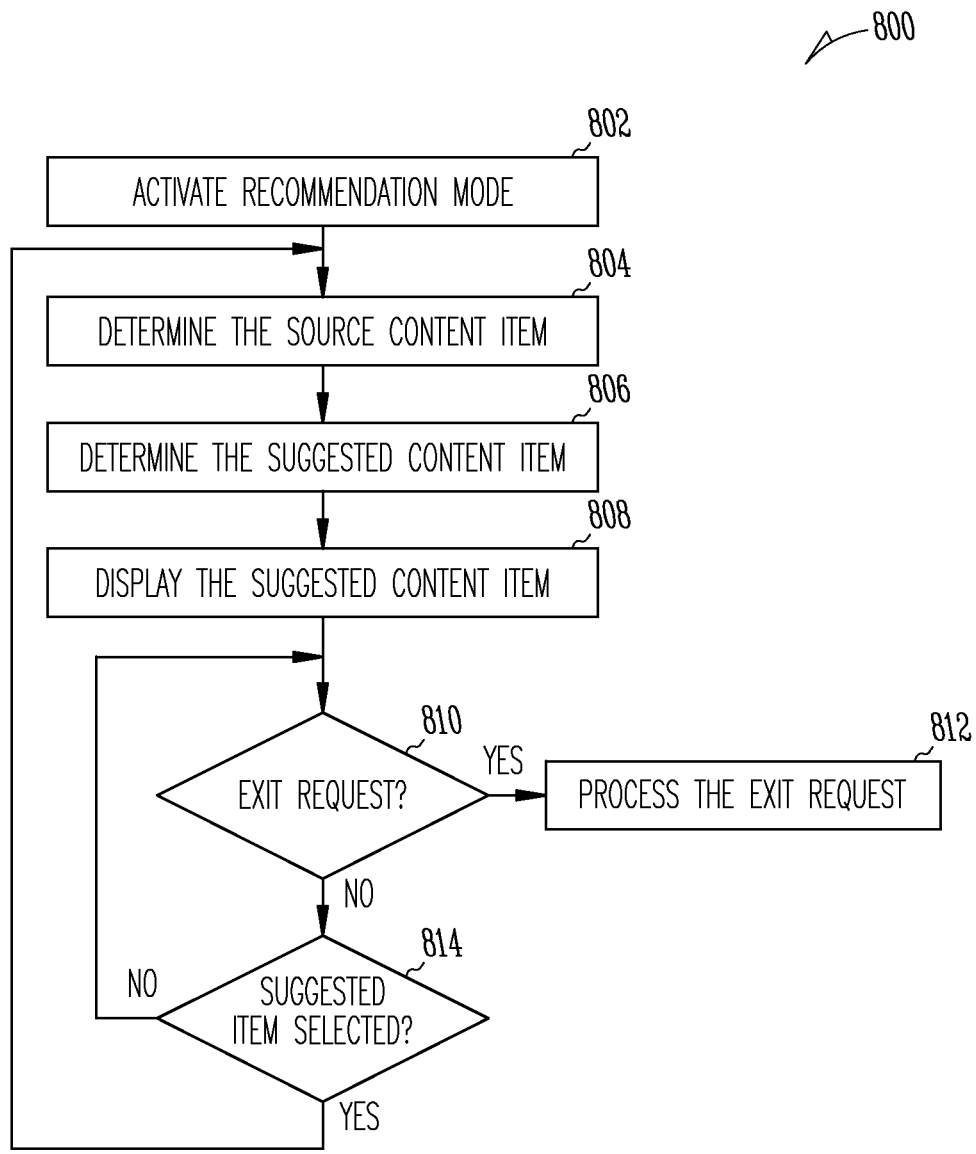
FIG. 8 is a flow chart illustrating a method, in accordance with an example embodiment, to provide recommendations with respect to the content items available for viewing.

FIG. 8 illustrates is an example method 800 to provide recommendations. The method 800 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 8, the method 800 commences with operation 802, where the communications module 202 of the system 200 receives a request to activate the recommendation mode. The recommendation mode may be activated by a viewer is a variety of ways. For example, as mentioned above, a viewer may activate the recommendation menu. The recommendation mode may also be activated by selecting a "Recommend" control presented on a media card. At operation 804, the anticipation module 230 determines the source content item and then determines one or more recommended content items, at operation 806 based, e.g., on metadata associated with the source content item and the viewer's profile.

The suggested content items are displayed at operation 808. The method 800 proceeds further to permit a viewer to explore further recommendation, unless it is determined, at operation 810, that the viewer requested to exit the recommendation code, in which case the system 200 processes the exit request, at operation 812. In one example embodiment, if it is determined, at operation 814, that the viewer selected a suggested content item, the method proceeds to operation 804 to display the selected content item as a new source item and continue with determining further suggested content.

The library margin menu discussed above, in one example embodiment, may be associated with a library grid. The library grid may be utilized to present to a viewer with even more items from the locally and remotely sourced content available for viewing. In one example embodiment, the items in the library grid may be presented to a viewer as thumbnail images or video. The library grid may be navigated utilizing the directional keys on a remote control device, and each content item in the library grid may be associated with a media card.

Figure 9:
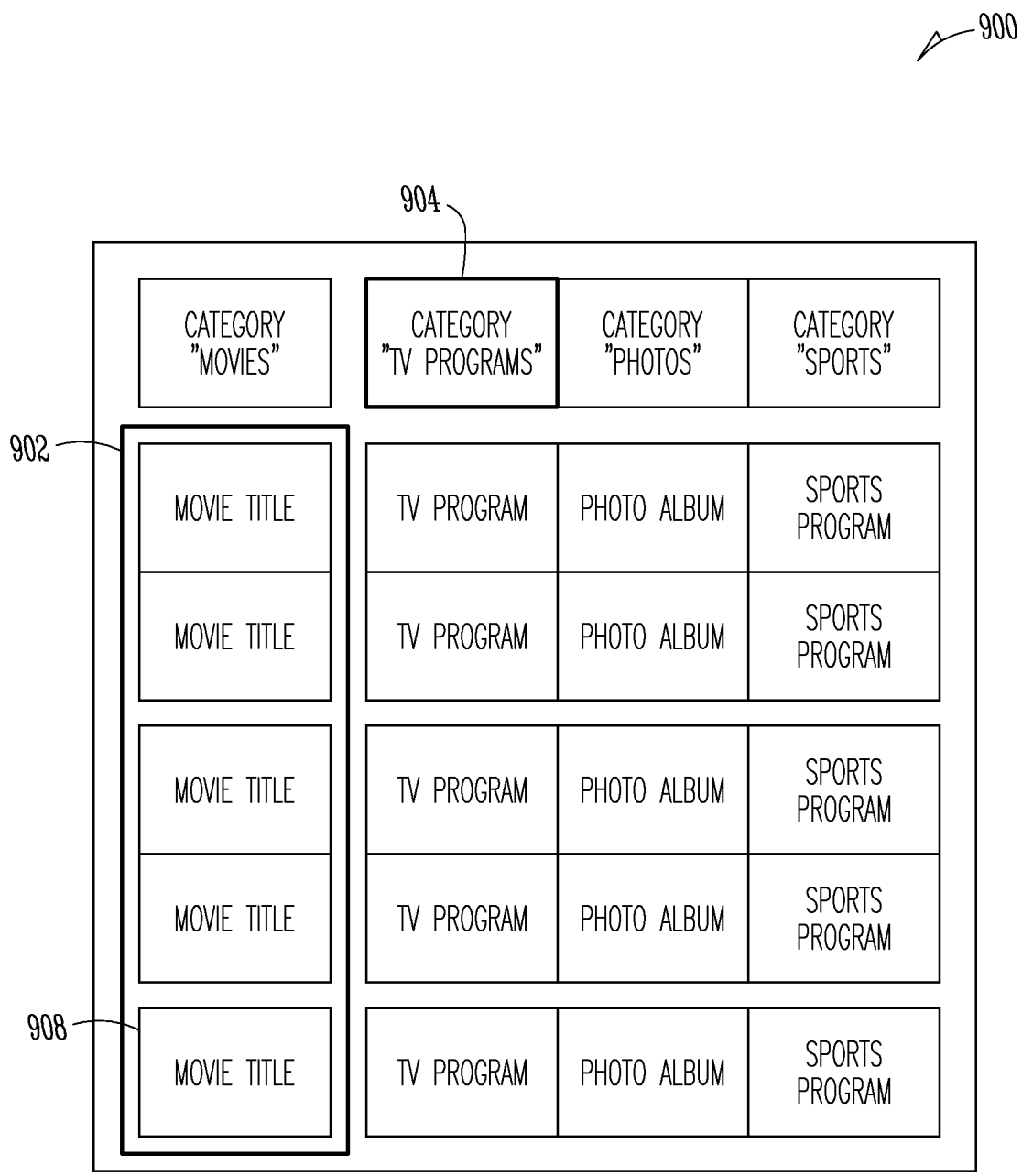
FIG. 9 illustrates a library grid, in accordance with an example embodiment.

An example library grid, illustrated in FIG. 9, includes a display area divided into a plurality of sections, where each section (e.g., each column 902) includes library content items associated with different categories 904. In some embodiments a viewer may be invited to use default categories (e.g., "Movies," "TV Programs," "Sports," "Photos," etc.) or create custom categories. Custom categories may be generated by a viewer or based upon the type and/or metadata of the aggregate content. For example, a custom category may be associated with an actor, a genre, a broadcast channel, the source of the content etc. In one example embodiment, the interface for navigating viewable content may be linked to one or more social networks. The categorization may then be driven by a social network (e.g., a viewer-selected group of reference people), where the content may be tagged by a person or by a mechanism associated with a particular social network.

It will be noted, that other margin menus may be provided instead of or in addition to the margin menus described above. A so-called scenographic margin menu, in one example embodiment, may be configured to permit a viewer to access different scenes within the content that is being presented to the viewer or to access related interactive content. The scenographic margin menu, in one example embodiment, may provide access to different portions of a particular program, similar to the scene selection feature available on digital video discs (DVDs).

Each item in the on scenographic margin menu may have associated "Preview" and "Select" (or "OK") options. The "Preview" option may permit a viewer to visually access a desired scene in the content, while continuing to display the currently viewed content. In one example embodiment, a viewer may be permitted to see other scenes in the program without obscuring the currently viewed portion of the content. The "Select" option, in one example embodiment, causes the currently viewed scene to be replaced by the selected scene. The scenographic margin menu, in one example embodiment, may be associated with a scenographic grid that provides the viewer with an expanded view of the scenes within the content. For example, where a program is a football match, the associated scenographic grid may permit the viewer to access the highlights of that football match. Within the scenographic grid, the viewer may move quickly to critical parts of the game, or replay a goal.

In one example embodiment, the items in the scenographic grid may be presented to a viewer as thumbnail images. The scenographic grid may be navigated utilizing the directional keys on a remote control device, and each content item in the scenographic grid may be associated with a media card providing additional information associated with any element of the scene. In one example embodiment, each content item associated with a particular scene in the scenographic margin menu (or in the scenographic grid) may be displayed utilizing a still image or streaming video.

Another feature that may be provided with the system 200 to navigate viewable content, as mentioned above, is a media card represented as a display area dedicated to additional information associated with a particular content item. A viewer may bring up a media card associated with the currently viewed content. A viewer may also be permitted to bring up a media card associated with a preview item. A media card, in one example embodiment, may have various actions associated with it. For example, a media card may include a "Save" action, to permit a viewer to save the associated content item for later viewing, and a "Recommend" action, to permit a viewer to drive a recommendations grid based on the piece of content associated with the media card. Returning to the "Save" action, in one example embodiment, if the content item associated with the media card is an on demand content item or a content item that may become available in the future, the "Save" action causes the system to bookmark the content item. If the content item associated with the media card is a current content item, the "Save" action causes the system to start recording the content to the viewer's personal video recorder. If the content item associated with the media card is a preview for a future broadcast then the "Save" action causes the system to book a recording for the future. An example media card is illustrated in FIG. 10.

Figure 10:
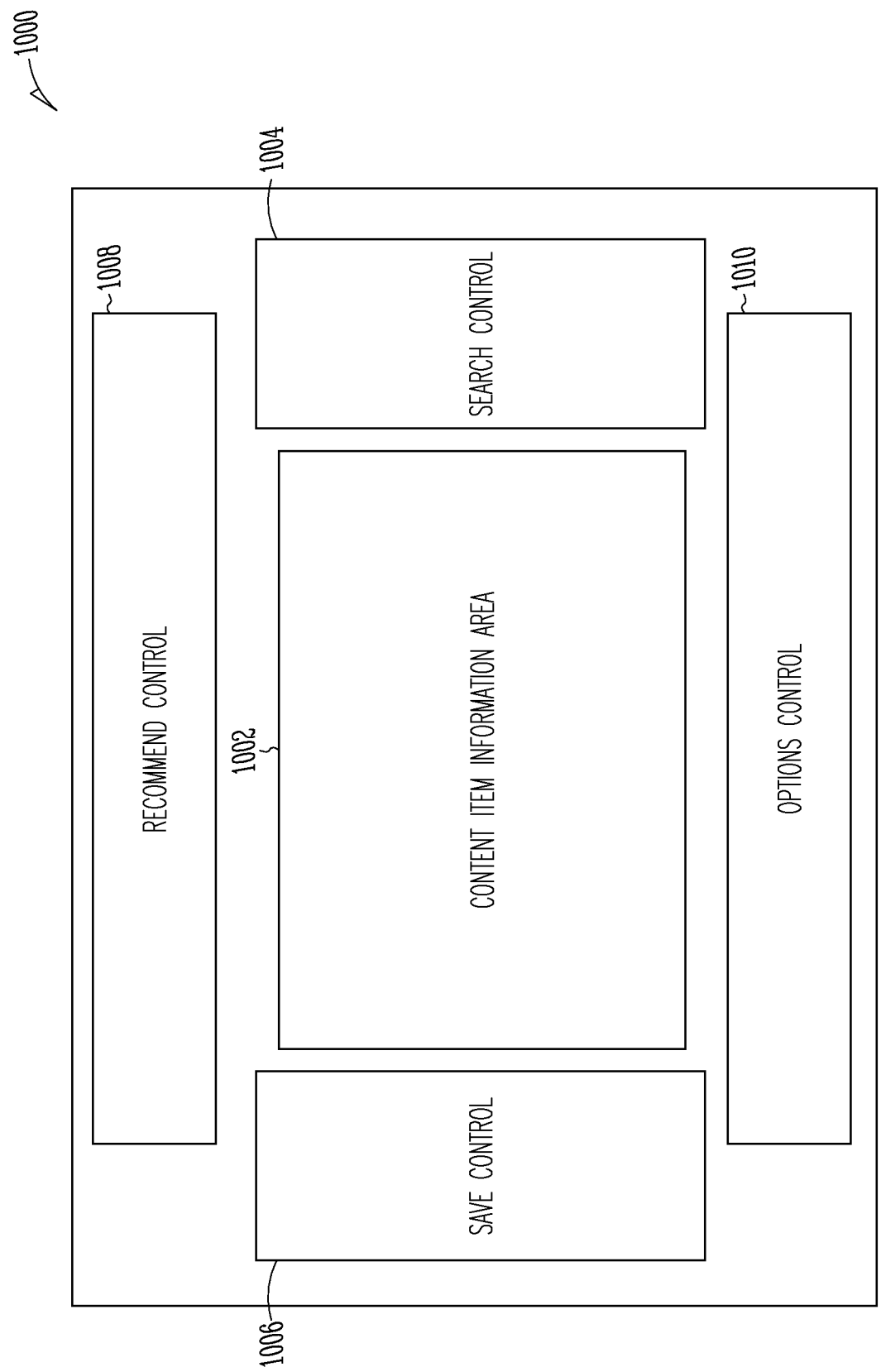
FIG. 10 illustrates a media card, in accordance with an example embodiment.

As shown in FIG. 10, a media card 1000 may include an information area 1002, a search control 1004 to activate a search mode, a save area 1006 to permit designating the content item for future viewing, a recommend control 1008 to activate a recommendation mode, and an options control 1010. The options control 1010 may activate various additional features associated with an example media card. It will be noted that, in one example embodiment, any element of the media card may be actionable (e.g., a viewer may click on an actor's name and view further information about the actor, etc.). The actions associated with a media card may be navigated to, in one example embodiment, utilizing the directional keys on a remote control device, which may map to the same direction as the UI itself. Activation of an action may, for some actions, present a viewer with additional choices before the action is completed. For example, for the "search" action, a list of associated keywords may be presented to provide the search term. The keywords, as well as other information displayed on a media card, may be stored as metadata associated with the content item.

It will be noted that, although the embodiments have been described by way of example with reference to digital video, it will be appreciated to a person of skill in the art that the techniques described herein may be utilized to navigate and to manage the choice of any digital data.

Figure 11:
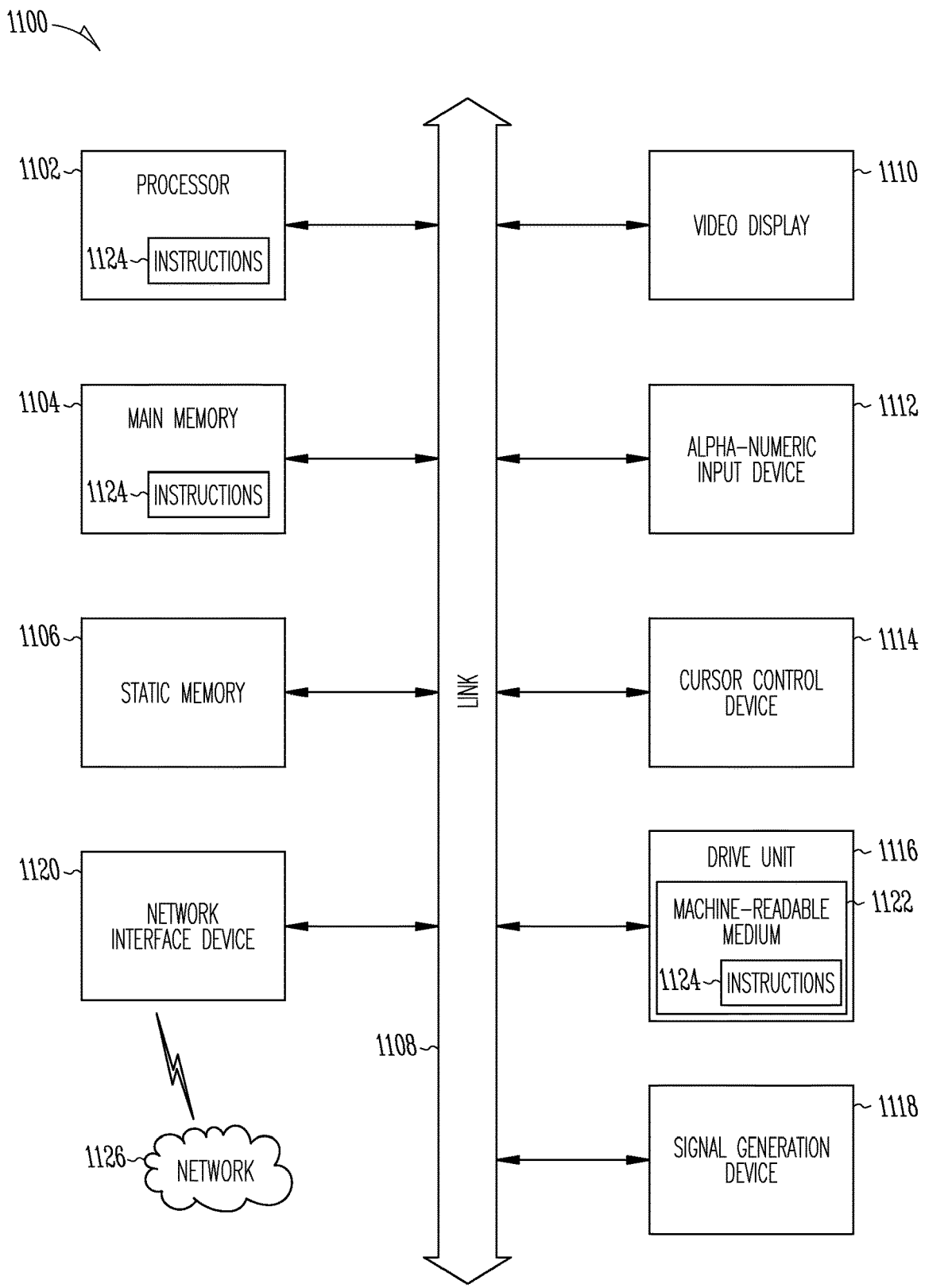
FIG. 11 illustrates a diagrammatic representation of a machine in the example form of a computer system within which a set of instructions, for causing the machine to perform any one or more of the methodologies discussed herein, may be executed.

FIG. 11 shows a diagrammatic representation of machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a real or virtual keyboard), a viewer interface (UI) navigation device 1114 (e.g., a remote control or a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., HTTP).

While the machine-readable medium 1122 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
    detecting, by one or more processors, a first user action during presentation of first media content on a display screen having regions that correspond to margins of the display screen;
    identifying, by the one or more processors and from among the regions of the display screen, a region that corresponds to a margin based on the first user action;
    causing, by the one or more processors and during presentation of the first media content, presentation of second media content in the region that corresponds to the margin and is identified based on the first user action; and
    causing, by the one or more processors and based on a second user action detected during presentation of the second media content, presentation of information that corresponds to the second user action in the region that corresponds to the margin and is identified based on the first user action.

2. The method of claim 1, wherein:
    the information that corresponds to the second user action includes third media content selected based on the first media content; and
    the causing of the presentation of the information that corresponds to the second user action in the identified region of the display screen includes causing presentation of a recommendation that includes the third media content in the identified region of the display screen.

3. The method of claim 1, wherein:
    the information that corresponds to the second user action includes third media content selected based on the second media content; and
    the causing of the presentation of the information that corresponds to the second user action in the identified region of the display screen includes causing presentation of a recommendation that includes the third media content in the identified region of the display screen.

4. The method of claim 1, wherein:
    the causing of the presentation of the second media content in the identified region of the display screen includes causing presentation of a recommendation that includes the second media content in the identified region of the display screen.

5. The method of claim 4, wherein:
    the recommendation that includes the second media content is a first recommendation; and
    the causing of the presentation of the information that corresponds to the second user action in the identified region of the display screen includes causing presentation of a second recommendation that includes third media content in the identified region of the display screen.

6. The method of claim 1, wherein:
    the detecting of the first user action includes receiving a first input from a device configured to select media content; and
    the method further comprises:
    detecting the second user action during the presentation of the first media content by receiving a second input from the device.

7. The method of claim 1, wherein:
    the first user action indicates a first direction among a set of directions selectable by a device; and
    the identifying of the region of the display screen is based on the first direction indicated by the first user action.

8. The method of claim 7, wherein:
    the second user action indicates the first direction indicated by the first user action; and
    the causing of the presentation of the information that corresponds to the second media content is based on the first direction indicated by the second user action and by the first user action.

9. The method of claim 7, wherein:
the second user action indicates a second direction distinct from the first direction indicated by the first user action; and
the causing of the presentation of the information that corresponds to the second media content is based on the second direction indicated by the second user action.

10. The method of claim 7, further comprising:
detecting a third user action that indicates a second direction perpendicular to the first direction indicated by the first user action; and
causing presentation of third media content in the identified region of the display screen, the third media content being selected based on the information presented in the identified region of the display screen.

11. The method of claim 7, further comprising:
detecting a third user action that indicates a second direction opposite to the first direction; and
ceasing the presentation of the information that corresponds to the second user action based on the third user action indicating the second direction opposite to the first direction.

12. The method of claim 1, wherein:
the first user action results from operation of a first directional control element among a set of directional control elements on a device; and
the identifying of the region of the display screen is based on the operation of the first directional control element on the device.

13. The method of claim 12, wherein:
the second user action results from a further operation of the first directional control element on the device; and
the causing of the presentation of the information that corresponds to the second user action is based on the further operation of the first directional control element on the device.

14. The method of claim 13, further comprising:
detecting a third user action resultant from operation of a second directional control element among the set of directional control elements, the second directional control element being oriented perpendicular to the first directional control element; and
causing presentation of third media content in the identified region of the display screen, the third media content being selected in response to the third user action and based on the second media content presented in the identified region of the display screen.

15. The method of claim 13, further comprising:
detecting a third user action resultant from operation of a second directional control element among the set of directional control elements, the second directional control element being oriented opposite to the first directional control element; and
ceasing the presentation of the information that corresponds to the second user action in response to the third user action.

16. A non-transitory machine-readable medium comprising instructions that, when executed by one or more processors of a media device, cause the media device to perform operations comprising:
detecting a first user action during presentation of first media content on a display screen having regions that correspond to margins of the display screen;
identifying, from among the regions of the display screen, a region that corresponds to a margin based on the first user action;
causing, during presentation of the first media content, presentation of second media content in the identified region that corresponds to the margin and is identified based on the first user action; and
causing, based on a second user action detected during presentation of the second media content, presentation of information that corresponds to the second user action in the identified region that corresponds to the margin and is identified based on the first user action.

17. The non-transitory machine-readable medium of claim 16, wherein:
the information that corresponds to the second user action includes third media content selected based on the first media content; and
the causing of the presentation of the information that corresponds to the second user action in the identified region of the display screen includes causing presentation of a recommendation that includes the third media content in the identified region of the display screen.

18. The non-transitory machine-readable medium of claim 16, wherein:
the causing of the presentation of the second media content in the identified region of the display screen includes causing presentation of a recommendation that includes the second media content in the identified region of the display screen.

19. A system comprising:
one or more processors; and
a memory storing instructions that, when executed by at least one processor among the one or more processors, cause the system to perform operations comprising:
detecting a first user action during presentation of first media content on a display screen having regions that correspond to margins of the display screen;
identifying, from among the regions of the display screen, a region that corresponds to a margin based on the first user action;
causing, during presentation of the first media content, presentation of second media content in the identified region that corresponds to the margin and is identified based on the first user action; and
causing, based on a second user action detected during presentation of the second media content, presentation of information that corresponds to the second user action in the identified region that corresponds to the margin and is identified based on the first user action.

20. The system of claim 19, wherein:
the first user action indicates a first direction among a set of directions selectable by a device;
the identifying of the region of the display screen is based on the first direction indicated by the first user action;
the second user action indicates a second direction distinct from the first direction indicated by the first user action; and
the causing of the presentation of the information that corresponds to the second media content is based on the second direction indicated by the second user action.

* * * * *